United States Patent
Ilinich et al.

(10) Patent No.: US 10,821,423 B2
(45) Date of Patent: Nov. 3, 2020

(54) DIESEL OXIDATION CATALYST COMBINING PLATINUM GROUP METAL WITH BASE METAL OXIDE

(71) Applicant: BASF Corporation, Florham Park, NJ (US)

(72) Inventors: Oleg Ilinich, Monmouth, NJ (US); Stanley Roth, Yardley, PA (US)

(73) Assignee: BASF Corporation, Florham Park, NJ (US)

(*) Notice: Subject to any disclaimer, the term of this patent is extended or adjusted under 35 U.S.C. 154(b) by 186 days.

(21) Appl. No.: 15/773,705

(22) PCT Filed: Nov. 3, 2016

(86) PCT No.: PCT/IB2016/056620
§ 371 (c)(1),
(2) Date: May 4, 2018

(87) PCT Pub. No.: WO2017/077479
PCT Pub. Date: May 11, 2017

(65) Prior Publication Data
US 2018/0318805 A1   Nov. 8, 2018

Related U.S. Application Data

(60) Provisional application No. 62/251,875, filed on Nov. 6, 2015.

(51) Int. Cl.
*B01J 23/89* (2006.01)
*B01D 53/94* (2006.01)
(Continued)

(52) U.S. Cl.
CPC ........ *B01J 23/8986* (2013.01); *B01D 53/944* (2013.01); *B01D 53/9477* (2013.01);
(Continued)

(58) Field of Classification Search
CPC .............. B01J 2523/828; B01J 37/0246; B01J 35/0006; B01J 37/0244; B01J 37/0248;
(Continued)

(56) References Cited

U.S. PATENT DOCUMENTS 8,765,625 B2   1/2014   Hao et al.
8,778,831 B2   7/2014   Southward et al.
(Continued)

FOREIGN PATENT DOCUMENTS

WO   WO 2015/187664   12/2015

OTHER PUBLICATIONS

Heo et al., "Ultra Low Temperature CO and HC Oxidation Over Cu-Based Mixed Oxides for Future Automotive Applications." *Applied Catalysis B: Enviromental*, 2014, vol. 160-161, pp. 365-373.

*Primary Examiner* — Anthony Ayala Delgado
(74) *Attorney, Agent, or Firm* — Womble Bond Dickinson (US) LLP

(57) ABSTRACT

A diesel oxidation catalyst composition is provided, the composition including at least one platinum group metal impregnated onto a porous refractory oxide material in particulate form and at least one base metal oxide impregnated onto a porous refractory oxide material in particulate form, wherein the porous refractory oxide material impregnated with at least one platinum group metal and the porous refractory oxide material impregnated with at least one base metal oxide are in the form of a mixture or wherein the at least one platinum group metal and the at least one base metal oxide are impregnated on the same porous refractory oxide material. The diesel oxidation catalyst provides synergistic enhancement of carbon monoxide oxidation as well as relatively unimpaired hydrocarbon oxidation. Methods of making and using the catalyst composition are also pro-
(Continued)

vided, as well as emission treatment systems comprising a catalyst article coated with the catalyst composition.

23 Claims, 2 Drawing Sheets

(51) Int. Cl.
| | |
|---|---|
| *B01J 35/04* | (2006.01) |
| *F01N 3/20* | (2006.01) |
| *B01J 23/00* | (2006.01) |
| *B01J 37/08* | (2006.01) |
| *B01J 35/00* | (2006.01) |
| *B01J 37/02* | (2006.01) |
| *F01N 13/00* | (2010.01) |
| *B01J 37/04* | (2006.01) |
| *F01N 3/10* | (2006.01) |
| *F01N 3/28* | (2006.01) |

(52) U.S. Cl.
CPC ........... *B01J 23/002* (2013.01); *B01J 23/894* (2013.01); *B01J 23/8926* (2013.01); *B01J 35/0006* (2013.01); *B01J 35/04* (2013.01); *B01J 37/0201* (2013.01); *B01J 37/0248* (2013.01); *B01J 37/04* (2013.01); *B01J 37/088* (2013.01); *F01N 3/103* (2013.01); *F01N 3/20* (2013.01); *F01N 3/2803* (2013.01); *F01N 13/009* (2014.06); *B01D 2255/1021* (2013.01); *B01D 2255/1023* (2013.01); *B01D 2255/2065* (2013.01); *B01D 2255/2066* (2013.01); *B01D 2255/2068* (2013.01); *B01D 2255/2073* (2013.01); *B01D 2255/20746* (2013.01); *B01D 2255/20753* (2013.01); *B01D 2255/20761* (2013.01); *B01D 2255/20784* (2013.01); *B01D 2255/9022* (2013.01); *B01J 2523/00* (2013.01); *F01N 2370/02* (2013.01); *Y02A 50/2341* (2018.01)

(58) Field of Classification Search
CPC ........ B01J 23/42; B01J 29/76; B01J 37/0201; B01J 2219/00164; B01J 23/40; B01J 23/6562; B01J 29/74; B01D 2255/1021; B01D 53/9468; B01D 2255/9032; B01D 2255/20761; B01D 2255/903; B01D 2255/904; F01N 3/103; F01N 2510/0684; Y10S 502/52712; Y10S 502/52713
See application file for complete search history.

(56) References Cited

U.S. PATENT DOCUMENTS

| | | |
|---|---|---|
| 9,034,269 B2 | 5/2015 | Hilgendorff et al. |
| 9,140,167 B2 | 9/2015 | Bergeal et al. |
| 2002/0131915 A1 | 9/2002 | Shore et al. |
| 2011/0165046 A1 | 7/2011 | Drews et al. |
| 2014/0044630 A1 | 2/2014 | Swallow et al. |
| 2015/0165422 A1* | 6/2015 | Sung .................. B01J 37/0244 423/213.5 |

* cited by examiner

DIESEL OXIDATION CATALYST COMBINING PLATINUM GROUP METAL WITH BASE METAL OXIDE

CROSS-REFERENCE TO RELATED APPLICATIONS

The present application is a U.S. National Stage of International Patent Application PCT/IB2016/056620, filed Nov. 3, 2016 and claims priority to U.S. Provisional Patent Application No. 62/251,875, filed Nov. 6, 2015. The disclosures of each of the applications noted above are incorporated herein by reference in their entirety.

FIELD OF THE INVENTION

The present invention relates to a diesel oxidation catalyst composition, catalyst articles coated with such a composition, emission treatment systems comprising such a catalyst article, and methods of use thereof.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as platinum group metals (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

Platinum (Pt) remains the most effective platinum group metal for oxidizing CO and HC in a DOC, in the presence of sulfur. After high temperature aging under lean conditions there can be an advantage to adding Pd to a Pt-based DOC, because Pd stabilizes Pt against sintering at the high temperature. One of the major advantages of using palladium (Pd) based catalysts is the lower cost of Pd compared to Pt. However, Pd-based DOCs, without Pt, typically show higher light-off temperatures for oxidation of CO and HC, especially when used with HC storage materials, potentially causing a delay in HC and or CO light-off. For this reason care must be taken to design the catalyst to maximize positive interactions while minimizing negative interactions.

Diesel engines utilizing advanced combustion technologies are able to reduce $NO_x$ and PM emissions by reducing the combustion flame temperature within the engine cylinder and by increasing the uniformity and mixing of the fuel charge prior to ignition. However, in the process of changing the combustion process to lower $NO_x$ and PM emissions, the overall quantity of CO and HC emissions can increase, the nature of the hydrocarbons formed can change, and the exhaust temperature may be lowered. In some instances, the CO and HC emissions from advanced combustion diesel engines is 50% to about 100% higher than the HC and CO emissions from traditional diesel engines. This result has driven the need for lower DOC light-off temperatures to manage CO and HC emissions. This in turn has further increased the use of DOCs with high PGM loadings, with an associated increase in the cost of the DOC.

Since these exhaust characteristics will create significant challenges for current diesel emission catalyst technology, there remains a need in the art for new catalyst formulations that meet increasingly stringent environmental regulations.

SUMMARY OF THE INVENTION

The invention provides a diesel oxidation catalyst composition, the composition comprising at least one platinum group metal impregnated onto a porous refractory oxide material in particulate form and at least one base metal oxide impregnated onto a porous refractory oxide material in particulate form, wherein the porous refractory oxide material impregnated with at least one platinum group metal and the porous refractory oxide material impregnated with at least one base metal oxide are in the form of a mixture or wherein the at least one platinum group metal and the at least one base metal oxide are impregnated on the same porous refractory oxide material. The catalyst composition provides a synergistic effect on CO conversion activity without significant adverse impact on HC conversion.

In certain embodiments, the porous refractory oxide material is alumina, silica-alumina, ceria or a combination thereof. In one embodiment, the catalyst comprises a first porous refractory oxide material impregnated with one or both of platinum and palladium in admixture with a second porous refractory oxide material impregnated with a base metal oxide selected from oxides of copper, manganese, iron, chromium, nickel, cerium, cobalt, and combinations thereof. In such an embodiment, the first porous refractory oxide material can be, for example, alumina, silica-alumina, or a combination thereof, and the second porous refractory oxide material can be, for example, alumina, silica-alumina, ceria, ceria-zirconia, or a combination thereof.

In certain embodiments, the concentration of at least one platinum group metal is about 0.1 wt. % to about 10 wt. % relative to the weight of the porous refractory oxide material upon which the platinum group metal is impregnated, and the concentrations of at least one base metal is about 1 wt. % to about 50 wt. % relative to the weight of the porous refractory oxide material upon which the base metal oxide is impregnated. In one embodiment, the platinum group metal comprises platinum, palladium, or a combination thereof, and the base metal of the at least one base metal oxide comprises copper. Advantageously, the at least one base metal oxide can include a combination of copper oxide at a copper concentration of about 5 wt. % to about 25 wt. %, relative to the weight of the porous refractory oxide material on which the base metal oxide is impregnated, with one or more additional base metal oxides present at a total base metal concentration of about 5 wt. % to about 25 wt. %, relative to the weight of the porous refractory oxide material on which the base metal oxide is impregnated. For example, the weight ratio of copper to additional base metal can be about 1:5 to about 5:1. In one exemplary embodiment, the base metal oxide impregnated on the porous refractory oxide material comprises about 5 wt. % to about 25 wt. % copper, about 5 wt. % to about 25 wt. % manganese, and optionally about 1 wt. % to about 10 wt. % of cerium or praseodymium.

In another aspect, the invention provides a catalyst article, comprising a catalyst substrate having a plurality of channels adapted for gas flow, each channel having a wall surface upon which a washcoat is disposed, wherein the washcoat comprises the diesel oxidation catalyst composition according to any of the embodiments noted herein. Exemplary catalyst substrates include flow-through monoliths and wall-flow filters. In certain embodiments, the catalyst article is characterized by a $T_{50}$ for CO oxidation of about 130° C. or less and a $T_{50}$ for HC oxidation of about 182° C. or less when the catalyst article has been hydrothermally aged for 16 hours at 800° C. in flowing air containing 10% steam and tested as set forth in Example 8, or the catalyst article is characterized by a $T_{50}$ for CO oxidation of about 115° C. or less and a $T_{50}$ for HC oxidation of about 180° C. or less when the catalyst article has been hydrothermally aged for 16 hours at 800° C. in flowing air containing 10% steam and tested as set forth in Example 8. In certain embodiments, the catalyst article of the invention can be characterized by a $T_{50}$ for CO oxidation that is about 30° C. to about 65° C. lower than a $T_{50}$ for CO oxidation of a catalyst article comprising a reference diesel oxidation catalyst having the same platinum group metal loading without any base metal oxide, and wherein the catalyst article is characterized by a $T_{50}$ for HC oxidation that is within about 5° C. of the catalyst article comprising the reference diesel oxidation catalyst, when the catalyst article has been hydrothermally aged for 16 hours at 800° C. in flowing air containing 10% steam and subjected to a light-off test in a laboratory reactor at a GHSV of 60,000 $h^{-1}$, a temperature interval of 70° C.-450° C., a temperature ramp rate of 1° C./sec, and a test gas composition of 260 ppm CO, 150 ppm NO, 460 ppm total hydrocarbons on a $C_1$ basis, 5% steam, 5% $CO_2$, and the balance air.

In one embodiment, the catalyst article comprises a washcoat comprising at least one platinum group metal impregnated onto a first porous refractory oxide material and another washcoat comprising at least one base metal oxide impregnated onto a second porous refractory oxide material, the washcoats separately coated in two layers on the catalyst substrate.

In yet another aspect, the invention provides an emission treatment system for treatment of an exhaust gas stream, the emission treatment system comprising:

i) a first catalyst article according to any embodiment set forth herein (i.e., comprising the DOC composition of the invention) positioned in fluid communication with the exhaust gas stream and adapted for oxidation of carbon monoxide and hydrocarbon gases within the exhaust gas stream to form a treated exhaust gas stream; and ii) at least one additional catalyst article downstream from the first catalyst article and in fluid communication with the treated exhaust gas stream, the at least one additional catalyst article adapted for ammonia oxidation, particulate filtration, $NO_x$ storage, $NO_x$ trapping, selective catalytic reduction of $NO_x$, or combinations thereof. Typically, a diesel engine is positioned upstream of the first catalyst article, the diesel engine producing the exhaust gas stream.

The invention also provides a method of treating an exhaust gas stream, comprising passing the exhaust gas stream through a catalyst article according to any embodiment set forth herein such that carbon monoxide and hydrocarbon gases within the exhaust gas stream are oxidized within the catalyst article.

In a still further aspect, a method of preparing a diesel oxidation catalyst composition comprising both a platinum group metal and a base metal oxide impregnated on a refractory oxide material is provided, comprising treating a first refractory oxide material with one or more water soluble salts of a platinum group metal; treating a second refractory oxide material with one or more water soluble salts of a base metal; and combining the first impregnated porous refractory oxide material with the second impregnated porous refractory oxide material to form a particulate catalyst mixture, wherein combination of a water soluble salt of a base metal and a water soluble salt of a platinum group metal in the same solution is avoided.

Still further, the invention provides a method of preparing a diesel oxidation catalyst composition comprising both a platinum group metal and a base metal oxide impregnated on a refractory oxide material, the method comprising treating a refractory oxide material with one or more water soluble salts of a platinum group metal and treating a refractory oxide material with one or more water soluble salts of a base metal, the treating steps comprising either (A) the steps of:

i) treating a first porous refractory oxide material in particulate form with an aqueous solution comprising either a) one or more water soluble salts of a platinum group metal or b) one or more water soluble salts of a base metal, to form a first impregnated porous refractory oxide material;

ii) drying and calcining the first impregnated porous refractory oxide material;

iii) treating the first impregnated porous refractory oxide material in a second impregnation step with an aqueous solution comprising the other of a) one or more water soluble salts of a platinum group metal or b) one or more water soluble salts of a base metal not used in treatment step i), to form a second impregnated porous refractory oxide material; and iv) drying and calcining the second impregnated porous refractory oxide material; or (B) the steps of:

i) treating a first porous refractory oxide material in particulate form with an aqueous solution comprising one or more water soluble salts of a platinum group metal to form a first impregnated porous refractory oxide material;

ii) drying and calcining the first impregnated porous refractory oxide material;

iii) treating a second porous refractory oxide material in a second impregnation step with an aqueous solution comprising one or more water soluble salts of a base metal to form a second impregnated porous refractory oxide material;

iv) drying and calcining the second impregnated porous refractory oxide material; and v) combining the first impregnated porous refractory oxide material with the second impregnated porous refractory oxide material to form a particulate catalyst mixture, wherein combination of a water soluble salt of a base metal and a water soluble salt of a platinum group metal in the same solution is avoided.

The method can further include forming a washcoat slurry of the second impregnated porous refractory oxide material of step (A)(iv) above or the particulate catalyst mixture of step (B)(v) above; coating the washcoat slurry onto a catalyst substrate comprising a plurality of channels adapted for gas flow, each channel having a wall surface upon which the washcoat slurry is deposited; and calcining the catalyst article. The catalyst composition formed in the method can include any of the catalyst composition embodiments set forth herein.

The method can further include forming a washcoat slurry of the first impregnated porous material of step B(ii), and coating this washcoat slurry as a first layer onto a catalyst substrate. Forming a washcoat slurry of the second impregnated porous material of step B(iv) above, and coating this washcoat slurry as a second layer on top of the substrate containing the first layer; followed by drying and calcining the catalyst article. A depiction of this two-layer catalyst is shown in FIG. 2.

The method can further include forming a two-layer catalyst with the reverse configuration to that above, by creating a first layer of the second impregnated porous material of step B(iv), followed by a second layer of the first impregnated porous material of step B(ii); followed by drying and calcining the catalyst article.

The invention includes, without limitation, the following embodiments.

Embodiment 1: A diesel oxidation catalyst composition, the composition comprising at least one platinum group metal impregnated onto a porous refractory oxide material in particulate form and at least one base metal oxide impregnated onto a porous refractory oxide material in particulate form, wherein the porous refractory oxide material impregnated with at least one platinum group metal and the porous refractory oxide material impregnated with at least one base metal oxide are in the form of a mixture or wherein the at least one platinum group metal and the at least one base metal oxide are impregnated on the same porous refractory oxide material.

Embodiment 2: The diesel oxidation catalyst composition of any preceding or subsequent embodiment, comprising a porous refractory oxide material impregnated with one or both of platinum and palladium, and impregnated with at least one base metal oxide selected from oxides of copper, manganese, iron, chromium, cobalt, nickel, cerium, praseodymium, neodymium, and combinations thereof.

Embodiment 3: The diesel oxidation catalyst composition of any preceding or subsequent embodiment, comprising a first porous refractory oxide material impregnated with one or both of platinum and palladium in admixture with a second porous refractory oxide material impregnated with at least one base metal oxide selected from oxides of copper, manganese, iron, chromium, cobalt, nickel, cerium, praseodymium, neodymium, and combinations thereof.

Embodiment 4: The diesel oxidation catalyst composition of any preceding or subsequent embodiment, wherein the first porous refractory oxide material is alumina, silica-alumina, or a combination thereof, and the second porous refractory oxide material is alumina, silica-alumina, ceria, ceria-zirconia, or a combination thereof.

Embodiment 5: The diesel oxidation catalyst composition of any preceding or subsequent embodiment, wherein the concentration of at least one platinum group metal is about 0.1 wt. % to about 10 wt. % relative to the weight of the porous refractory oxide material upon which the platinum group metal is impregnated, and the concentration of the base metal of the at least one base metal oxide is about 1 wt. % to about 50 wt. % relative to the weight of the porous refractory oxide material upon which the base metal oxide is impregnated.

Embodiment 6: The diesel oxidation catalyst composition of any preceding or subsequent embodiment, wherein the platinum group metal comprises platinum, palladium, or a combination thereof, and the base metal of the at least one base metal oxide comprises copper.

Embodiment 7: The diesel oxidation catalyst composition of any preceding or subsequent embodiment, wherein the at least one base metal oxide comprises copper oxide at a copper concentration of about 5 wt. % to about 25 wt. %, relative to the weight of the porous refractory oxide material on which the base metal oxide is impregnated, with optionally one or more additional base metal oxides present at a total base metal concentration of about 5 wt. % to about 25 wt. %, relative to the weight of the porous refractory oxide material on which the base metal oxide is impregnated.

Embodiment 8: The diesel oxidation catalyst composition of any preceding or subsequent embodiment, wherein the weight ratio of copper to additional base metal is about 1:5 to about 5:1.

Embodiment 9: The diesel oxidation catalyst composition of any preceding or subsequent embodiment, wherein base metal oxide impregnated on the porous refractory oxide material comprises about 5 wt. % to about 25 wt. % copper, about 5 wt. % to about 25 wt. % manganese, and optionally about 1 wt. % to about 10 wt. % of cerium, relative to the weight of the porous refractory oxide material on which the base metal oxide is impregnated.

Embodiment 10: A catalyst article, comprising a catalyst substrate having a plurality of channels adapted for gas flow, each channel having a wall surface upon which a washcoat is disposed, wherein the washcoat comprises the diesel oxidation catalyst composition of any preceding or subsequent embodiment.

Embodiment 11: The catalyst article of any preceding or subsequent embodiment, wherein a washcoat comprising at least one platinum group metal impregnated onto a first porous refractory oxide material and another washcoat comprising at least one base metal oxide impregnated onto a second porous refractory oxide material are separately coated in two layers on the catalyst substrate.

Embodiment 12: The catalyst article of any preceding or subsequent embodiment, wherein the catalyst article is characterized by a $T_{50}$ for CO oxidation that is about 30° C. to about 65° C. lower than a $T_{50}$ for CO oxidation of a catalyst article comprising a reference diesel oxidation catalyst having the same platinum group metal loading without any base metal oxide, and wherein the catalyst article is characterized by a $T_{50}$ for HC oxidation that is within about 5° C. of the catalyst article comprising the reference diesel oxidation catalyst, when the catalyst article has been hydrothermally aged for 16 hours at 800° C. in flowing air containing 10% steam and subjected to a light-off test in a laboratory reactor at a GHSV of 60,000 $h^{-1}$, a temperature interval of 70° C.-450° C., a temperature ramp rate of 1° C./sec, and a test gas composition of 260 ppm CO, 150 ppm NO, 460 ppm total hydrocarbons on a $C_1$ basis, 5% steam, 5% $CO_2$, and the balance air.

Embodiment 13: A method of treating an exhaust stream, comprising passing the exhaust stream through a catalyst article according to any preceding or subsequent embodiment such that carbon monoxide and hydrocarbon gases within the exhaust stream are oxidized within the catalyst article.

Embodiment 14: A method of preparing a diesel oxidation catalyst composition comprising both a platinum group metal and a base metal oxide impregnated on a refractory oxide material, comprising:

treating a first refractory oxide material with one or more water soluble salts of a platinum group metal;

treating a second refractory oxide material with one or more water soluble salts of a base metal; and combining the first impregnated porous refractory oxide material with the second impregnated porous refractory oxide material to form a particulate catalyst mixture, wherein combination of a water soluble salt of a base metal and a water soluble salt of a platinum group metal in the same solution is avoided.

Embodiment 15: The method of any preceding or subsequent embodiment, further comprising forming a washcoat slurry of the particulate catalyst mixture; coating the washcoat slurry onto a catalyst substrate comprising a plurality of channels adapted for gas flow, each channel having a wall surface upon which the washcoat slurry is deposited; and calcining the catalyst article.

Embodiment 16: The method of any preceding or subsequent embodiment, wherein the particulate catalyst mixture comprises a first porous refractory oxide material impregnated with one or both of platinum and palladium in admixture with a second porous refractory oxide material impregnated with a base metal oxide selected from oxides of copper, manganese, iron, chromium, cobalt, nickel, cerium, praseodymium, neodymium, and combinations thereof.

Embodiment 17: The method of any preceding or subsequent embodiment, wherein the first porous refractory oxide material is alumina, silica-alumina, or a combination thereof, and the second porous refractory oxide material is alumina, silica-alumina, ceria, or a combination thereof.

Embodiment 18: The method of any preceding or subsequent embodiment, wherein the concentration of at least one platinum group metal is about 0.1 wt. % to about 10 wt. % relative to the weight of the porous refractory oxide material upon which the platinum group metal is impregnated, and the concentration of at least one base metal oxide is about 1 wt. % to about 50 wt. % relative to the weight of the porous refractory oxide material upon which the base metal oxide is impregnated.

Embodiment 19: The method of any preceding or subsequent embodiment, wherein the platinum group metal comprises platinum, palladium, or a combination thereof, and the base metal of the at least one base metal oxide comprises copper.

Embodiment 20: The method of any preceding or subsequent embodiment, wherein the refractory metal material impregnated with base metal oxide comprises copper oxide at a copper concentration of about 5 wt. % to about 25 wt. %, relative to the weight of the porous refractory oxide material on which the base metal oxide is impregnated, with optionally one or more additional base metal oxides present at a total base metal concentration of about 5 wt. % to about 25 wt. %, relative to the weight of the porous refractory oxide material on which the base metal oxide is impregnated.

Embodiment 21: The method of any preceding or subsequent embodiment, wherein the weight ratio of copper to additional base metal is about 1:5 to about 5:1.

Embodiment 22: The method of any preceding or subsequent embodiment, wherein base metal oxide impregnated on the porous refractory oxide material comprises about 5 wt. % to about 25 wt. % copper, about 5 wt. % to about 25 wt. % manganese, and optionally about 1 wt. % to about 10 wt. % of cerium, relative to the weight of the porous refractory oxide material on which the base metal oxide is impregnated.

Embodiment 23: An emission treatment system for treatment of an exhaust gas stream, the emission treatment system comprising:

i) a diesel engine producing an exhaust gas stream;

ii) a first catalyst article according to any preceding or subsequent embodiment positioned in fluid communication with the exhaust gas stream and adapted for oxidation of carbon monoxide and hydrocarbon gases within the exhaust stream to form a treated exhaust gas stream; and iii) at least one additional catalyst article downstream from the first catalyst article and in fluid communication with the treated exhaust gas stream, the at least one additional catalyst article adapted for ammonia oxidation, particulate filtration, $NO_x$ storage, $NO_x$ trapping, selective catalytic reduction of $NO_x$, or combinations thereof.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
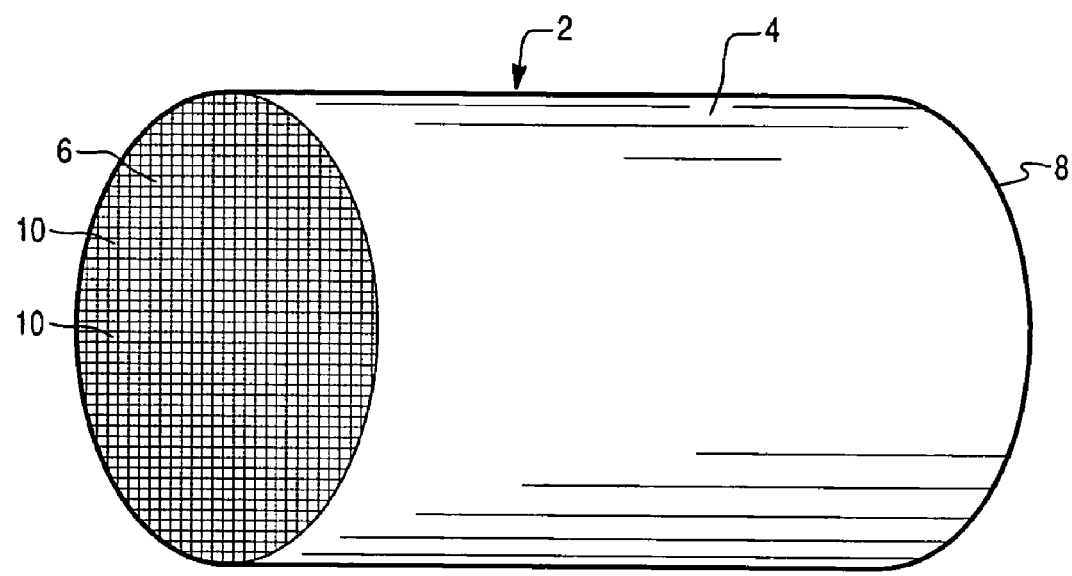
FIG. 1 is a perspective view of a honeycomb-type substrate carrier which may comprise a diesel oxidation catalyst (DOC) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides a diesel oxidation catalyst (DOC) composition suitable for at least partial conversion of gaseous HC and CO emissions, as well as the SOF portion of particulate matter, and which further promotes the oxidation of NO to $NO_2$. The DOC composition includes both a PGM component and a base metal oxide component impregnated on a porous refractory oxide support that provide a synergistic effect on CO conversion activity without significant adverse impact on HC conversion. As used herein, "impregnated" or "impregnation" refers to permeation of the catalytic material into the porous structure of the support material. The DOC composition can be prepared using incipient wetness impregnation techniques and coated onto a catalyst substrate using a washcoat technique as set forth more fully below.

Catalyst Composition

The DOC composition includes a PGM component impregnated on a porous refractory oxide support. As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In certain embodiments, the platinum group metal comprises a combination of platinum and palladium, such as in a weight ratio of about 1:10 to about 10:1, more typically in a platinum to palladium equal to or greater than about 1.5:1, equal to or greater than about 2:1, or equal to or greater than about 5:1. The concentrations of PGM component (e.g., Pt, Pd or a combination thereof) can vary, but will typically be from about 0.1 wt. % to about 10 wt. % relative to the weight of the porous refractory oxide support material (e.g., about 1 wt. % to about 6 wt. % relative to the refractory oxide support).

As used herein, "porous refractory oxide" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 m$^2$/g, often up to about 200 m$^2$/g or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of 60 to 350 m$^2$/g, and typically 90 to 250 m$^2$/g.

The DOC composition also comprises one or more base metal oxide components impregnated on a porous refractory oxide support, such as any of the porous refractory oxide materials noted hereinabove including alumina. As used herein, "base metal oxide" refers to an oxide compound comprising a transition metal or lanthanide that is catalytically active for oxidation of CO and/or conversion of HC, or promotes another catalytic component to be more active for oxidation of CO and/or conversion of HC, and particularly includes copper, manganese, iron, chromium, cobalt, nickel, cerium, praseodymium, neodymium, and combinations thereof. For ease of reference herein, concentrations of base metal oxide materials are reported in terms of elemental metal concentration rather than the oxide form. The total concentration of base metal in the base metal oxide component (e.g., copper, manganese, iron, chromium, cobalt, nickel, cerium, praseodymium, neodymium, and combinations thereof) can vary, but will typically be from about 1 wt. % to 50 wt. % relative to the weight of the porous refractory oxide support material (e.g., about 10 wt. % to about 50 wt. % relative to the refractory oxide support).

Combinations of base metal oxides are particularly advantageous for use in the invention. In certain embodiments, the base metal oxide combines copper oxide with one or more additional base metal oxides, such as manganese oxide, iron oxide, or cobalt oxide. In one embodiment, the base metal oxide component comprises copper oxide and manganese oxide, optionally including one or more additional base metal oxides such as iron oxide or cobalt oxide. Particularly advantageous combinations include a combination of copper oxide at a copper concentration (i.e., concentration of copper metal) of about 5 wt. % to about 25 wt. % (relative to the weight of the porous refractory oxide support material) with one or more additional base metal oxides at a total base metal concentration of about 5 wt. % to about 25 wt. % (relative to the weight of the porous refractory oxide support material). When used in combination with other oxides, copper oxide is typically present at a concentration that is equal to or greater than the other base metal oxide components, such as wherein the weight ratio of copper to additional base metal is about 1:5 to about 5:1, more typically about 1.5:1 to about 3:1.

Combinations of copper oxide with manganese oxide, optionally further including ceria or praseodymium, are preferred in certain embodiments. In one embodiment, the base metal oxide impregnated on a porous refractory oxide support (e.g., alumina) comprises about 5 wt. % to about 25 wt. % copper (e.g., about 8 wt. % to about 25 wt. %), about 5 wt. % to about 25 wt. % manganese (e.g., about 5 wt. % to about 20 wt. %), and optionally about 1 wt. % to about 10 wt. % of cerium (e.g., about 1 wt. % to about 5 wt. %), wherein the total base metal concentration is no more than about 50 wt. %, all weight percentages relative to the weight of the porous refractory oxide support material.

The weight ratio of the PGM component impregnated on the refractory oxide support to the base metal impregnated on the refractory oxide support is typically in the range of about 1:20 to about 2:1 or about 1:10 to about 2:1 (e.g., 1:5 to about 1:1, or about 1:4 to about 1:2).

Substrate

According to one or more embodiments, the substrate for the DOC composition may be constructed of any material typically used for preparing automotive catalysts and will typically comprise a metal or ceramic honeycomb structure. The substrate typically provides a plurality of wall surfaces upon which the DOC washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil (0.006 inches), or 600 cpsi and a wall thickness of 4 mil (0.004 inches). However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flows through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the DOC composition can permeate into the pore structure of the porous walls (i.e., partially or fully occluding the pore openings) in addition to being disposed on the surface of the walls.

Figure 2:
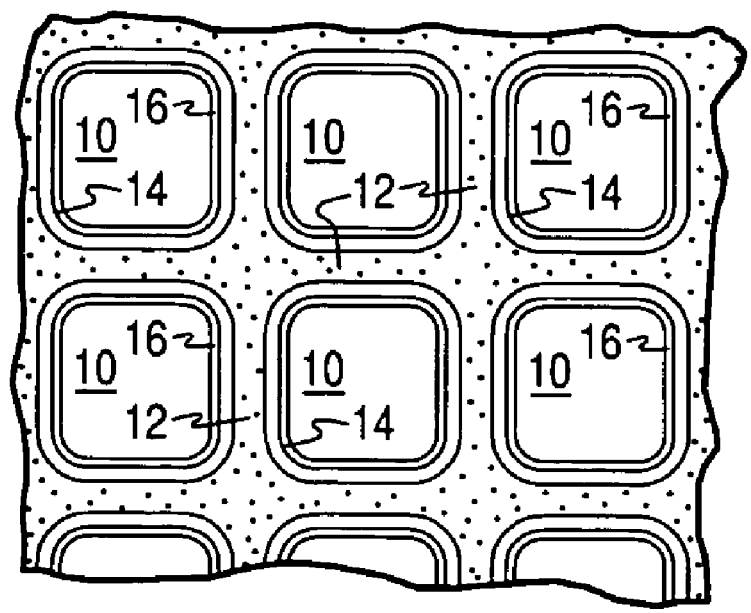
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the DOC composition (including both impregnated base metal catalyst and impregnated PGM and support material) on the catalyst substrate, such as a monolithic flow-through substrate, is typically from about 0.5 to about 6 g/in$^3$, and more typically from about 1 to about 5 g/in$^3$. Total loading of the PGM component without support material (i.e., the Pt or Pd or combination thereof) is typically in the range of about 30 to about 200 g/in$^3$. Total loading of the base metal oxide component without support material (e.g., the copper oxide, manganese oxide, ceria, or combinations thereof) is typically in the range of about 0.1 to about 1.5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed. Note that in this case the loading of base metal oxide is used to define total catalyst weight per unit volume, while the metallic form of the base metal is used to define its weight percent loading on the refractory oxide support.

Method of Making DOC Composition

Preparation of the PGM-impregnated refractory oxide material typically comprises impregnating the refractory oxide support material in particulate form with a PGM solution, such as one or more of a platinum solution and a palladium solution. Multiple PGM components (e.g., platinum and palladium) can be impregnated at the same time or separately, and can be impregnated on the same support particles or separate support particles using an incipient wetness technique. The support particles are typically dry enough to absorb substantially all of the solution to form a moist solid. Aqueous solutions of water soluble compounds or complexes of the PGM component are typically utilized, such as palladium or platinum nitrate, tetraammine palladium or platinum nitrate, or tetraammine palladium or platinum acetate. Following treatment of the support particles with the PGM solution, the particles are dried, such as by heat treating the particles at elevated temperature (e.g., 100-150° C.) for a period of time (e.g., 1-3 hours), and then calcining to convert the PGM components to a more catalytically active form. An exemplary calcination process involves heat treatment in air at a temperature of about 400-550° C. for 1-3 hours. The above process can be repeated as needed to reach the desired level of PGM impregnation. The resulting material can be stored as a dry powder or in slurry form.

Preparation of the base metal-impregnated refractory oxide material typically comprises impregnating the refractory oxide support material in particulate form with a base metal solution using an incipient wetness technique. Multiple base metal components (e.g., copper and manganese) can be impregnated at the same time or separately, and can be impregnated on the same support particles or separate support particles. Again, the support particles are usually sufficiently dry to absorb substantially all of the solution to form a moist solid. Aqueous solutions of water soluble compounds or complexes of the base metal components are typically utilized, such as nitrate or acetate salts of the base metal with specific examples including copper (II) nitrate, manganese (II) nitrate, and ceric ammonium nitrate. Following treatment of the support particles with the base metal solution, the particles are dried, such as by heat treating the particles at elevated temperature (e.g., 100-150° C.) for a period of time (e.g., 1-3 hours), and then calcining to convert the base metal components to a more catalytically active oxide form. An exemplary calcination process involves heat treatment in air at a temperature of about 400-800° C. for 1-3 hours. The above process can be repeated as needed to reach the desired level of base metal impregnation. The resulting material can be stored as a dry powder or in slurry form.

Impregnation of the base metal and the PGM on the refractory oxide particles can occur in separate steps with separate particulate carrier material as noted above, or the impregnation steps can be applied to the same refractory oxide material in sequential steps. For example, base metal components can be impregnated onto the carrier particles, followed by drying and calcining as described above, and the same carrier particles can be subjected to PGM impregnation process as noted above. If applying both PGM and base metal materials to the same carrier particles, it is advisable to avoid combining base metal salts with PGM salts in the same solution so as to avoid possible alloying of the base metal components with PGM components within the catalyst material. The order of addition of the PGM and base metal components is not critical and these components can be applied to the support material in any order.

Substrate Coating Process

The above-noted catalyst composition, either in the form of carrier particles containing a PGM component and separate carrier particles containing a base metal component or carrier particles with combined PGM and base metal components impregnated therein, is mixed with water to form a slurry for purposes of coating a catalyst substrate, such as a honeycomb-type substrate. In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants). It is advantageous to avoid the addition of acids to the slurry in order to avoid the formation of dissociated base metal or PGM ions or related metal species that could lead to alloying within the catalyst material. Accordingly, in certain embodiments, the slurry used to coat the catalyst substrate can be substantially or completely acid-free. A typical pH range for the slurry is about 5 to about 6.

Optionally, as noted above, the slurry may contain one or more hydrocarbon (HC) storage component for the adsorption of hydrocarbons (HC). Any known hydrocarbon storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of from at least about 25:1, preferably at least about 50:1, with useful ranges of from about 25:1 to 1000:1, 50:1 to 500:1, as well as about 25:1 to 300:1. Preferred zeolites include ZSM, Y and beta zeolites. A particularly preferred adsorbent may comprises a beta zeolite of the type disclosed in U.S. Pat. No. 6,171,556, incorporated herein by reference in its entirety. When present, zeolite or other HC storage components are typically used in an amount of about 0.05 $g/in^3$ to about 1 $g/in^3$.

When present, the alumina binder is typically used in an amount of about 0.05 $g/in^3$ to about 1 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 20 to about 30 microns. The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers. In one embodiment, the catalyst composition is applied in multiple layers with each layer having a different composition. For example, the bottom layer (e.g., layer 14 of FIG. 2) can comprise the DOC catalyst composition of the invention including a PGM component and a base metal oxide component and the top layer (e.g., layer 16 of FIG. 2) can comprise the DOC catalyst composition of the invention including a PGM component and a base metal oxide component in admixture with one or more of an alumina binder and a zeolite material. The relative amount of the DOC catalyst composition in each layer can vary, with an exemplary dual layer coating comprising about 40-90% by weight of the total weight of DOC catalyst composition including a PGM component and a base metal oxide component in the bottom layer (adjacent to the substrate surface) and about 10-60% by weight of the total weight of the DOC catalyst composition in the top layer. In another embodiment, the refractory oxide material carrying the PGM component can be coated in a first layer and the refractory oxide material carrying the base metal oxide component can be coated as a separate layer.

As noted above, a catalyst article comprising the DOC composition of the invention exhibits enhanced CO conversion activity without significant adverse impact on HC conversion. Accordingly, one or more embodiments of the invention provide a catalyst article comprising the DOC composition of the invention characterized by a $T_{50}$ for CO oxidation of about 130° C. or less when the catalyst article has been hydrothermally aged for 16 hours at 800° C. in flowing air containing 10% steam and tested in a flow reactor system with a feed gas and gas hourly space velocity (GHSV) as set forth in Example 8. In certain embodiments, the invention provides a catalyst article characterized by a $T_{50}$ for CO oxidation of about 120° C. or less, about 115° C. or less, or about 110° C. or less when aged and tested as noted above. In some embodiments, the catalyst article has a $T_{50}$ for CO oxidation of about 100° C. or less or even about 90° C. or less when aged and tested as noted above. In certain embodiments, using the same aging and testing conditions noted above, the catalyst article of the invention is characterized by a $T_{50}$ for HC oxidation of about 182° C. or less, about 180° C. or less, or about 178° C. or less. In some embodiments, the catalyst article has a $T_{50}$ for HC oxidation of about 176° C. or less or even about 174° C. or less when aged and tested as noted above.

In certain embodiments, a catalyst article comprising the DOC composition can be characterized by a $T_{50}$ for CO oxidation that is about 30° C. to about 65° C. lower (e.g., at least about 30° C. lower, at least about 35° C. lower, or at least about 40° C. lower) than a $T_{50}$ for CO oxidation of a catalyst article comprising a reference diesel oxidation catalyst having the same platinum group metal loading without any base metal oxide (i.e., wherein base metal oxide is absent from the catalyst composition), and wherein the catalyst article is characterized by a $T_{50}$ for HC oxidation that is within about 10° C. (i.e., neither higher nor lower by more than about 10° C.), more typically within about 6° C., of the catalyst article comprising the reference diesel oxidation catalyst, when the catalyst article has been hydrothermally aged for 16 hours at 800° C. in flowing air containing 10% steam and tested as set forth in Example 8. An exemplary reference diesel oxidation catalyst is set forth herein as Comparative Example 1.

Emission Treatment System

The present invention also provides an emission treatment system that incorporates the DOC composition described herein. The DOC composition of the present invention is typically used in an integrated emissions treatment system comprising one or more additional components for the treatment of diesel exhaust gas emissions. For example, the emission treatment system may further comprise a catalyzed soot filter (CSF) component and/or a selective catalytic reduction (SCR) catalytic article. The diesel oxidation catalyst of the invention is typically located upstream from the soot filter and/or selective catalytic reduction component, although the relative placement of the various components of the emission treatment system can be varied. The treatment system can include further components, such as ammonia oxidation materials, additional particulate filtration components, $NO_x$ storage and/or trapping components, and reductant injectors. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium).

Figure 3:
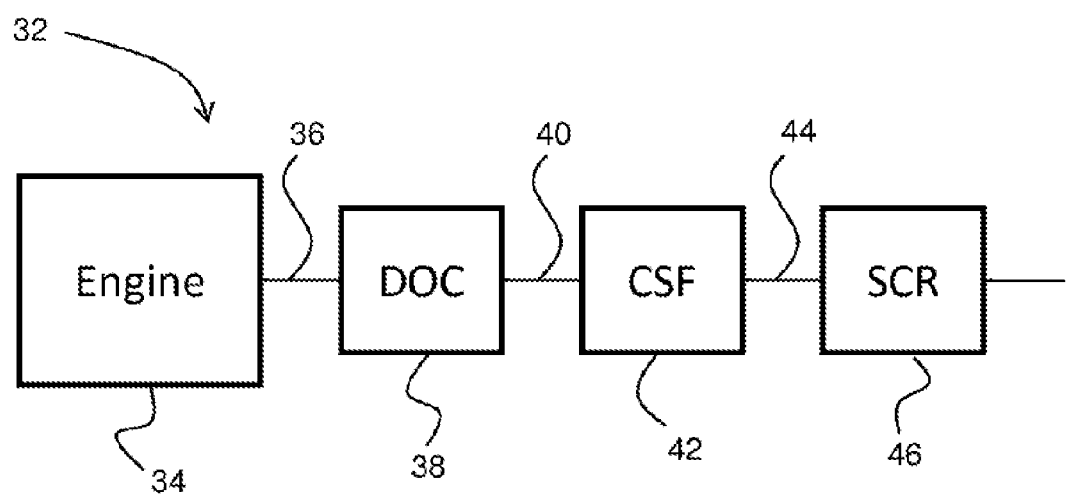
FIG. 3 shows a schematic depiction of an embodiment of an emission treatment system in which a DOC of the present invention is utilized.

One exemplary emissions treatment system is illustrated in FIG. 3, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38, which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC. The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. After removal of particulate matter, via CSF 42, the exhaust gas stream is conveyed via exhaust pipe 44 to a downstream selective catalytic reduction (SCR) component 16 for the further treatment and/or conversion of $NO_x$.

The DOC 38 may be placed in a close-coupled position. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures.

Experimental

Aspects of the present invention are more fully illustrated by the following examples, which are set forth to illustrate certain aspects of the present invention and are not to be construed as limiting thereof.

Example 1: Separate Powders PtPd/$Al_2O_3$ and 15Cu10Mn5Ce/$Al_2O_3$ 1.1. Preparation of Alumina Powder Impregnated with Platinum and Palladium 69.7 g of Pd-Tetraammine Nitrate solution (4.630 wt. % Pd) is combined with 189.5 g of Pt-Tetraammine Nitrate solution (3.406 wt. % Pt) and 33.6 g of deionized (DI) water. 133.9 g of alumina powder was impregnated with 97.6 g of the mixed solution. The impregnated powder was dried 2 hours at 120° C. and calcined 1 hour at 450° C. The procedure was repeated twice to impregnate alumina with the total amount of the mixed solution (292.8 g). The final powder contained 2.10 wt. % Pt and 1.05 wt. % Pd.

1.2. Preparation of Alumina Powder Impregnated with Copper Oxide, Manganese Oxide and Cerium Oxide 82.5 g $Cu(NO_3)_2 \cdot 2.5\ H_2O$ was combined with 96.9 g of $Mn(NO_3)_2$ solution (15.2 wt. % Mn) and 141.0 g of $Ce(NO_3)_3$ solution (5.26 wt. % Ce). 150.0 g of gamma-alumina powder was impregnated with ½ of the mixed solution (160.2 g). The impregnated powder was dried 2 hours at 120° C. and calcined 1 hour at 500° C. The procedure was repeated to impregnate alumina with the total amount of the mixed solution (320.4 g). The final powder contained 15.0 wt. % Cu, 10.0 wt. % Mn and 5.0 wt. % Ce relative to $Al_2O_3$.

1.3. Preparation of Slurry $PtPd/Al_2O_3+15Cu1-Mn5Ce/Al_2O_3$ and Catalyst Coating 143.7 g of the alumina powder impregnated with platinum and palladium from example 1.1 was combined with 168.7 g of the alumina powder impregnated with copper oxide, manganese oxide and cerium oxide from example 1.2. 600 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.2 g/inch³.

Example 2: Single Powder $[PtPd+20Cu20Mn]/Al_2O_3$

2.1. Preparation of Alumina Powder Impregnated with Copper Oxide and Manganese Oxide 343.3 g of $Cu(NO_3)_2$ solution (17.0 wt. % Cu) was combined with 383.3 g of $Mn(NO_3)_2$ solution (15.2 wt. % Mn). 296.9 g of gamma-alumina powder was impregnated with ½ of the mixed solution (363.3 g). The impregnated powder was dried 2 hours at 120° C. and calcined 1 hour at 500° C. The procedure was repeated to impregnate alumina with the total amount of the mixed solution (726.6 g). The final powder contained 20.0 wt. % Cu and 20.0 wt. % Mn relative to $Al_2O_3$.

2.2. Impregnation with Platinum and Palladium of the Alumina Powder Impregnated Copper Oxide and Manganese Oxide 41.3 g of Pt-amine complex solution (16.67 wt. % Pt) was diluted with 35.3 g of deionized (DI) water. 144.1 g of the alumina powder impregnated with copper oxide and manganese oxide, previously prepared as described in example 2.1, was impregnated with the solution. The impregnated powder was dried 2 hours at 120° C. and calcined 1 hour at 450° C. The calcined powder was further impregnated with 17.0 g of palladium nitrate solution (4.74 wt. % Pd), dried 2 hours at 120° C. and calcined 1 hour at 450° C. The final powder contained 4.54 wt. % Pt, 2.27 wt. % Pd and 93.19 wt. % of the alumina powder impregnated with copper oxide and manganese oxide that was prepared as described in paragraph 2.1.

2.3. Preparation of Slurry $[PtPd+20Cu20Mn]/Al_2O_3$ and Catalyst Coating 154.5 g of $[PtPd+CuMn]/Al_2O_3$ powder prepared as described in example 2.2 was combined with 151.1 g of gamma-alumina powder. 575 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.1 g/inch³.

Example 3: Separate Powders $PtPd/Al_2O_3$ and $20Cu20Mn/Al_2O_3$

Preparation of Slurry $PtPd/Al_2O_3+20Cu20Mn/Al_2O_3$ and Catalyst Coating 164.6 g of the alumina powder impregnated with platinum and palladium prepared as described in example 1.1 was combined with 142.7 g of the alumina powder impregnated with copper oxide and manganese oxide prepared as described in example 2.1. 580 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.2 g/inch³.

Example 4: Separate Powders $PtPd/Al_2O_3$ and $8Cu5Mn/CeO_2$

4.1. Preparation of Ceria Powder Impregnated with Copper Oxide and Manganese Oxide 219.6 g of $Cu(NO_3)_2$ solution (17.0 wt. % Cu) was combined with 86.9 g of $Mn(NO_3)_2$ solution (15.2 wt. % Mn). 219.6 g of ceria powder was impregnated with ½ of the mixed solution (101.9 g). The impregnated powder was dried 2 hours at 120° C. and calcined 1 hour at 500° C. The procedure was repeated to impregnate ceria with the total amount of the mixed solution. The final powder contained 8.0 wt. % Cu and 5.3 wt. % Mn relative to $CeO_2$.

4.2. Preparation of Slurry $PtPd/Al_2O_3+8Cu5Mn/CeO_2$ and Catalyst Coating 141.7 g of the alumina powder impregnated with platinum and palladium prepared as described in example 1.1 was combined with 167.4 g of ceria powder impregnated with copper oxide and manganese oxide prepared as described in example 4.1. 580 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.2 g/inch³.

Example 5: Separate Powders $PtPd/Al_2O_3$ and $15Cu10Mn/Al_2O_3$

5.1. Preparation of Alumina Powder Impregnated with Copper Oxide and Manganese Oxide 174.95 g of $Cu(NO_3)_2 \cdot 2.5\ H_2O$ salt was combined with 205.57 g of $Mn(NO_3)_2$ solution (15.2 wt. % Mn) and stirred to dissolve copper nitrate. 320 g of gamma-alumina powder was impregnated with the mixed solution. The impregnated powder was dried 2 hours at 120° C. and calcined 1 hour at 500° C. The final powder contained 15.0 wt. % Cu and 10.0 wt. % Mn relative to $Al_2O_3$.

5.2. Preparation of Slurry $PtPd/Al_2O_3+15Cu10Mn/Al_2O_3$ and Catalyst Coating 146.67 g of the alumina powder impregnated with platinum and palladium prepared as described in example 1.1 was combined with 162.75 g of the alumina powder impregnated with copper oxide and manganese oxide prepared as described in example 5.1. 580 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.2 g/inch$^3$.

Example 6: Separate Powders PtPd/Al$_2$O$_3$ and 15Cu5Ce/Al$_2$O$_3$ 6.1. Preparation of Alumina Powder Impregnated with Copper Oxide and Cerium Oxide 109.98 g of Cu(NO$_3$)$_2$*2.5 H$_2$O salt was combined with 188.04 g of Ce(NO$_3$)$_3$ solution (5.26 wt. % Ce) and 71.32 g deionized (DI) water, and stirred to dissolve copper nitrate. 200 g of gamma-alumina powder was impregnated with ½ of the mixed solution (184.67 g). The impregnated powder was dried 2 hours at 120° C. and calcined 1 hour at 500° C. The procedure was repeated to impregnate alumina with the total amount of the mixed solution. The impregnated powder was dried 2 hours at 120° C. and calcined 1 hour at 500° C. The final powder contained 15.0 wt. % Cu and 5.0 wt. % Ce relative to Al$_2$O$_3$.

6.2. Preparation of Slurry PtPd/Al$_2$O$_3$+15Cu5Ce/Al$_2$O$_3$ and Catalyst Coating 133.76 g of the alumina powder impregnated with platinum and palladium prepared as described in example 1.1 was combined with 148.60 g of the alumina powder impregnated with copper oxide and cerium oxide prepared as described in example 6.1. 520 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.12 g/inch$^3$.

Example 7: Separate Powders PtPd/Al$_2$O$_3$ and 15Cu/Al$_2$O$_3$ 7.1. Preparation of Alumina Powder Impregnated with Copper Oxide and Cerium Oxide 173.45 g of Cu(NO$_3$)$_2$ solution (17.0 wt. % Cu) was combined with 45.52 g DI water. 200 g of gamma-alumina powder was impregnated with the obtained solution. The impregnated powder was dried 2 hours at 120° C. and calcined 1 hour at 500° C. The final powder contained 15.0 wt. % Cu relative to Al$_2$O$_3$.

7.2. Preparation of Slurry PtPd/Al$_2$O$_3$+15Cu/Al$_2$O$_3$ and Catalyst Coating 170.03 g of the alumina powder impregnated with platinum and palladium prepared as described in example 1.1 was combined with 174.48 g of the alumina powder impregnated with copper oxide prepared as described in example 7.1. 644 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.1 g/inch$^3$.

Comparative Example 1: PtPd/Al$_2$O$_3$+Al$_2$O$_3$

Preparation of Slurry PtPd/Al$_2$O$_3$+Al$_2$O$_3$ and Catalyst Coating

The reference catalyst containing only Pt and Pd and no base metal oxides was prepared as follows: 146.7 g of the alumina powder impregnated with platinum and palladium prepared as described in example 1.1 was combined with 141.1 g of gamma-alumina powder. 540 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.1 g/inch$^3$.

Comparative Example 2: 15Cu10Mn5Ce/Al$_2$O$_3$+Al$_2$O$_3$

Preparation of Slurry 15Cu10Mn5Ce/Al$_2$O$_3$+Al$_2$O$_3$ and Catalyst Coating

The reference catalyst containing only base metal oxides and no Pt or Pd was prepared as follows: 88.0 g of the alumina powder impregnated with copper oxide and manganese oxide prepared as described in example 2.1 was combined with 72.7 g of gamma-alumina powder. 300 g of DI water was added to the mixed powder. The resulting slurry was thoroughly mixed, milled and coated on a cordierite monolith substrate (1 inch diameter by 3 inch long, 400 cpsi, 6 mil wall thickness). The coated monolith was dried 2 hours at 120° C. and calcined 1 hour at 450° C. Washcoat loading of the calcined monolith catalyst was 2.1 g/inch$^3$.

Example 8: Light-Off Testing

The prepared catalysts were hydrothermally aged (16 hours at 800° C. in flowing air containing 10% steam). Catalytic activities of the catalysts were characterized by conducting light-off tests in the laboratory reactor.

Light-Off Test Conditions:

Test Gas Composition

| | |
|---|---|
| CO: | 260 ppm |
| NO: | 150 ppm |
| Total hydrocarbons: | 460 ppm on C$_1$ basis (5% methane, 30% propylene, 25% toluene, 40% n-decane) |
| H$_2$O (steam): | 5% |
| CO$_2$: | 5% |
| Air: | balance |
| GHSV: | 60,000 h$^{-1}$ |
| Temperature interval: | 70° C.-450° C. |
| Temperature ramp rate: | 1° C./sec |

Experimental test results for the above-described catalysts are summarized in Table 1, where CO and hydrocarbons (HC) oxidation activities are represented in terms of the temperatures of 50% CO conversion (CO T$_{50}$) and 50% hydrocarbons conversions (HC T$_{50}$), respectively. CO concentration was measured using a Fourier Transform Infrared (FTIR) analyzer. Total hydrocarbons (THC) were measured using a Flame Ionization Detector (FID).

TABLE 1

CO and HC oxidation activities of catalysts of the invention in light-off test

| Catalyst | CO $T_{50}$ (° C.) | HC $T_{50}$ (° C.) |
|---|---|---|
| Example 1 | 115 | 173 |
| Example 2 | 115 | 179 |
| Example 3 | 113 | 181 |
| Example 4 | 90 | 174 |
| Comparative Example 1 | 150 | 175 |
| Comparative Example 2 | 299 | 361 |

The data of Table 1 show that the catalyst of Example 1 that contains both PtPd/Al$_2$O$_3$ and 15Cu10Mn5Ce/Al$_2$O$_3$ components has significantly higher CO oxidation activity (lower CO $T_{50}$) compared to PtPd/Al$_2$O$_3$—only (catalyst of Comparative Example 1) and 15Cu10Mn5Ce/Al$_2$O$_3$—only (catalyst of Comparative Example 2). CO oxidation activities of the other catalysts that contain both PtPd/Al$_2$O$_3$ and alumina supported base metal oxides (BMOs), i.e., the catalysts of Examples 2-4, are similar to or higher than that of the catalyst of Example 1. HC $T_{50}$ values for all catalysts that contain both PtPd/Al$_2$O$_3$ and alumina supported BMOs are about the same as that of the PtPd/Al$_2$O$_3$-only catalyst of Comparative Example 1, while the BMO-only catalyst of Comparative Example 2 has much higher HC $T_{50}$.

The catalysts of Examples 5-7 and Comparative Example 1 aged as specified above were also tested under dynamic conditions of a laboratory version of the standard "New European Driving Cycle" (NEDC) test, with an average inlet temperature of 165° C. The results of this test are shown in Table 2 as CO and HC conversions over the whole transient test.

TABLE 2

CO and HC oxidation activities of catalysts of the invention in NEDC test

| Catalyst | CO conversion (%) | HC conversion (%) |
|---|---|---|
| Example 5 | 83.5 | 55.5 |
| Example 6 | 86.0 | 48.6 |
| Example 7 | 83.7 | 46.2 |
| Comparative Example 1 | 69.9 | 55.5 |

In agreement with the above discussed results of the light-off test, the data of Table 2 show that the catalysts of Examples 5-7 that contain both PtPd/Al$_2$O$_3$ and Al$_2$O$_3$-supported BMO components have higher CO conversions (activities) than PtPd/Al$_2$O$_3$-only catalyst of Comparative Example 1 in the NEDC test. The catalyst of Example 5 that contains PtPd/Al$_2$O$_3$ and 15Cu10Mn/Al$_2$O$_3$ components also has the same HC activity as the PtPd/Al$_2$O$_3$-only catalyst of Comparative Example 1, while the catalysts of Example 6 (PtPd/Al$_2$O$_3$+15Cu5Ce/Al$_2$O$_3$) and Example 7 (PtPd/Al$_2$O$_3$+15Cu/Al$_2$O$_3$) have slightly lower HC oxidation activities.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A diesel oxidation catalyst composition, the composition comprising:
   at least one platinum group metal impregnated onto a first porous refractory oxide material in particulate form and
   at least one base metal oxide impregnated onto a second porous refractory oxide material in particulate form,
   wherein the at least one base metal oxide is copper oxide with one or more additional base metal oxides, the additional base metal oxides being selected from manganese oxide, iron oxide and cobalt oxide,
      wherein the total concentration of base metal oxide is from 10 to 50 wt. % relative to the weight of the second porous refractory oxide material upon which the base metal oxide is impregnated,
   wherein the first porous refractory oxide material impregnated with at least one platinum group metal and the second porous refractory oxide material impregnated with at least one base metal oxide are in the form of a mixture or
   wherein the first porous refractory oxide material and the second refractory oxide material are the same, such that the at least one platinum group metal and the at least one base metal oxide are impregnated on the same porous refractory oxide material.

2. The diesel oxidation catalyst composition of claim 1, wherein the first porous refractory oxide material and the second porous refractory oxide material are the same, and wherein the at least one platinum group metal is one or both of platinum and palladium.

3. The diesel oxidation catalyst composition of claim 1, wherein the first porous refractory oxide material and the second porous refractory oxide material are in the form of a mixture, and wherein
   the at least one platinum group metal is one or both of platinum and palladium.

4. The diesel oxidation catalyst composition of claim 3, wherein the first porous refractory oxide material is alumina, silica-alumina, or a combination thereof, and the second porous refractory oxide material is alumina, silica-alumina, ceria, ceria-zirconia, or a combination thereof.

5. The diesel oxidation catalyst composition of claim 1, wherein the concentration of the at least one platinum group metal is 0.1 wt. % to 10 wt. % relative to the weight of the first porous refractory oxide material upon which the platinum group metal is impregnated.

6. The diesel oxidation catalyst composition of claim 5, wherein the platinum group metal comprises platinum, palladium, or a combination thereof.

7. The diesel oxidation catalyst composition of claim 1, wherein the at least one base metal oxide comprises copper oxide at a copper concentration of 5 wt. % to 25 wt. %, relative to the weight of the second porous refractory oxide material on which the base metal oxide is impregnated, with the one or more additional base metal oxides present at a total base metal concentration of 5 wt. % to 25 wt. %, relative to the weight of the second porous refractory oxide material on which the base metal oxide is impregnated.

8. The diesel oxidation catalyst composition of claim 7, wherein the weight ratio of copper to additional base metal is 1:5 to 5:1.

9. The diesel oxidation catalyst composition of claim 7, wherein the base metal oxide impregnated on the second porous refractory oxide material comprises 5 wt. % to 25 wt. % copper, 5 wt. % to 25 wt. % manganese, and optionally 1 wt. % to 10 wt. % of cerium, relative to the weight of the second porous refractory oxide material on which the base metal oxide is impregnated.

10. A catalyst article, comprising a catalyst substrate having a plurality of channels adapted for gas flow, each channel having a wall surface upon which a washcoat is disposed, wherein the washcoat comprises the diesel oxidation catalyst composition of claim 1.

11. The catalyst article of claim 10, wherein a washcoat comprising the at least one platinum group metal impregnated onto the first porous refractory oxide material and another washcoat comprising the at least one base metal oxide impregnated onto the second porous refractory oxide material are separately coated in two layers on the catalyst substrate.

12. The catalyst article of claim 10,
wherein the catalyst article is characterized by a $T_{50}$ for CO oxidation that is about 30° C. to about 65° C. lower than a $T_{50}$ for CO oxidation of a catalyst article comprising a reference diesel oxidation catalyst having the same platinum group metal loading without any base metal oxide, and
wherein the catalyst article is characterized by a $T_{50}$ for HC oxidation that is within about 5° C. of the catalyst article comprising the reference diesel oxidation catalyst, when the catalyst article has been hydrothermally aged for 16 hours at 800° C. in flowing air containing 10% steam and subjected to a light-off test in a laboratory reactor at a GHSV of 60,000 $h^{-1}$, a temperature interval of 70° C.-450° C., a temperature ramp rate of 1° C./sec, and a test gas composition of 260 ppm CO, 150 ppm NO, 460 ppm total hydrocarbons on a $C_1$ basis, 5% steam, 5% $CO_2$, and the balance air.

13. A method of treating an exhaust stream, comprising passing the exhaust stream through a catalyst article according to claim 10 such that carbon monoxide and hydrocarbon gases within the exhaust stream are oxidized within the catalyst article.

14. An emission treatment system for treatment of an exhaust gas stream, the emission treatment system comprising:
  i) a diesel engine producing an exhaust gas stream;
  ii) a first catalyst article according to claim 10 positioned in fluid communication with the exhaust gas stream and adapted for oxidation of carbon monoxide and hydrocarbon gases within the exhaust stream to form a treated exhaust gas stream; and
  iii) at least one additional catalyst article downstream from the first catalyst article and in fluid communication with the treated exhaust gas stream, the at least one additional catalyst article adapted for ammonia oxidation, particulate filtration, $NO_x$ storage, $NO_x$ trapping, selective catalytic reduction of $NO_x$, or combinations thereof.

15. A method of preparing a diesel oxidation catalyst composition, comprising:
  treating a first porous refractory oxide material with one or more water soluble salts of a platinum group metal to give a first impregnated porous refractory oxide material;
  treating a second refractory oxide material with one or more water soluble salts of a base metal to give a second impregnated porous refractory oxide material, wherein the base metal is copper with one or more additional base metals, the additional base metals being selected from manganese, iron, and cobalt, wherein the total concentration of base metal oxide is from 10 to 50 wt. % relative to the weight of the second impregnated porous refractory oxide material; and
  combining the first impregnated porous refractory oxide material with the second impregnated porous refractory oxide material to form a particulate catalyst mixture, wherein combination of a water soluble salt of a base metal and a water soluble salt of a platinum group metal in the same solution is avoided,
  to give a diesel oxidation catalyst composition wherein:
  the first impregnated porous refractory oxide material and the second impregnated porous refractory oxide material are in the form of a mixture; or
  wherein the first porous refractory oxide material and the second refractory oxide material are the same, such that the at least one platinum group metal and the at least one base metal oxide are impregnated on the same porous refractory oxide material.

16. The method of claim 15, further comprising forming a washcoat slurry of the particulate catalyst mixture; coating the washcoat slurry onto a catalyst substrate comprising a plurality of channels adapted for gas flow, each channel having a wall surface upon which the washcoat slurry is deposited; and calcining the catalyst article.

17. The method of claim 15, wherein the first impregnated porous refractory oxide material is impregnated with one or both of platinum and palladium and is in admixture with the second impregnated porous refractory oxide material.

18. The method of claim 17, wherein the first porous refractory oxide material is alumina, silica-alumina, or a combination thereof, and the second porous refractory oxide material is alumina, silica-alumina, ceria, or a combination thereof.

19. The method of claim 15, wherein the concentration of the at least one platinum group metal is 0.1 wt. % to 10 wt. % relative to the weight of the first porous refractory oxide material upon which the platinum group metal is impregnated.

20. The method of claim 19, wherein the platinum group metal comprises platinum, palladium, or a combination thereof.

21. The method of claim 15, wherein the second impregnated porous refractory oxide material comprises copper oxide at a copper concentration of 5 wt. % to 25 wt. %, relative to the weight of the second porous refractory oxide material on which the base metal oxide is impregnated, with the one or more additional base metal oxides present at a total base metal concentration of 5 wt. % to 25 wt. %, relative to the weight of the second porous refractory oxide material on which the base metal oxide is impregnated.

22. The method of claim 21, wherein the weight ratio of copper to additional base metal is 1:5 to 5:1.

23. The method of claim 21, wherein base metal oxide impregnated on the second porous refractory oxide material comprises 5 wt. % to 25 wt. % copper, 5 wt. % to 25 wt. % manganese, and optionally 1 wt. % to 10 wt. % of cerium, relative to the weight of the second porous refractory oxide material on which the base metal oxide is impregnated.

* * * * *